UNITED STATES PATENT OFFICE.

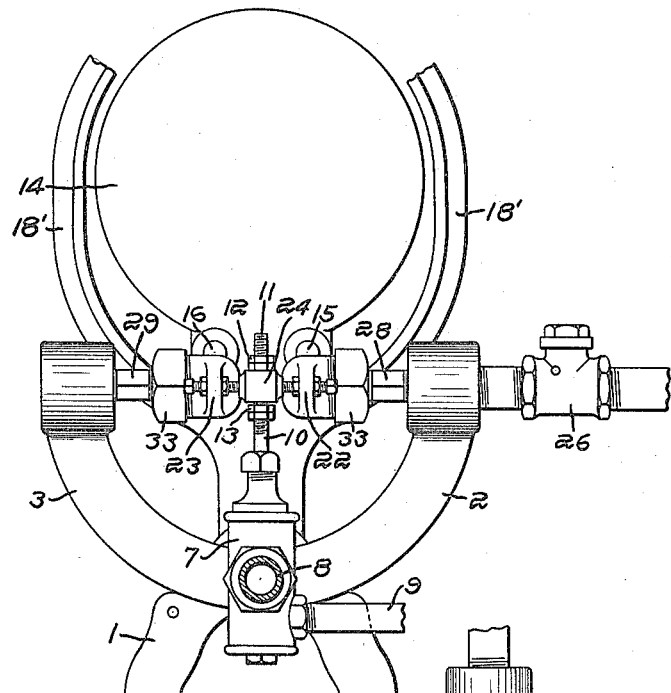

FRANK A. LITTLEFIELD, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP AND FLUID-COUPLING THEREFOR.

1,164,537. Specification of Letters Patent. Patented Dec. 14, 1915.

Application filed December 26, 1913. Serial No. 808,778.

*To all whom it may concern:*

Be it known that I, FRANK A. LITTLEFIELD, a citizen of the United States, and a resident of Nashua, in the county of Hillsboro and State of New Hampshire, have invented an Improvement in Steam-Traps and Fluid-Couplings Therefor, of which the following description, in connection with the accompanying drawings, is a specification, like characters on the drawings representing like parts.

This invention relates to steam traps and to fluid couplings peculiarly adapted for use therefor, but which may be employed in other relations and independently of such traps.

In order that the principle of the invention may be readily understood, I have disclosed a single embodiment thereof in the accompanying drawing, wherein—

Figure 1 is an end elevation of a steam trap to which my invention may be applied, parts being broken away; Fig. 2 is a plan view of said traps; and Fig. 3 is a transverse section on an enlarged scale taken through the yoke of the trap and the pipes connected thereto.

I have provided a fluid coupling which is peculiarly adapted for use in connection with a steam trap, and I have so disclosed it in the represented embodiment of the invention, but the coupling may be employed for other uses, as for example in a return trap or in connection with other fluid distributing or controlling apparatus.

Referring more particularly to the drawings, wherein I have represented one form of steam trap to which my invention may be applied, the tripod of the trap is represented at 1 and the yoke arms rising therefrom at 2 and 3, said arms being hollow, as clearly indicated in Fig. 3, and terminating in heads 4, 5. At a suitable point and preferably about midlength thereof as shown in Fig. 2, the yoke is provided with an externally threaded inlet pipe section 6, onto which is suitably fitted a valve casing 7 through valve controlled passages in which both the steam and the water of condensation are admitted as hereinafter set forth. The said valve casing may be of the type shown in my co-pending application Serial No. 751,738, and has fitted thereto opposite the inlet pipe 6 a steam inlet pipe 8, and also a water inlet pipe 9 constituting the inlet for the water of condensation from the boiler. The valve casing may be provided with suitable partitions providing valve seats as disclosed in said application, and not herein necessary more fully to disclose, and extending from said casing is a valve stem 10 threaded as indicated at 11 for the reception of nuts and lock nuts 12, 13 for coöperation with the steam trap in its turning movement.

The steam trap herein selected for illustration is provided with a bowl 14 having a pair of tubes 15, 16 suitably tapped thereinto or otherwise mounted therein, the former constituting a water outlet and the latter constituting in alternation a water inlet and a steam inlet. The pipe 16 may communicate with a steam duct cast in the wall of the bowl and having an outlet communicating with the interior of the bowl at the top thereof in a customary manner. The pipes 15, 16 are provided with elbow pipes 17, 18 supported as hereinafter set forth in the heads 4, 5 of the yoke, so that the bowl 14 may tilt for filling and for emptying the same. Preferably, though not necessarily, the pipe 15, 16 may be sprung toward each other, so that normally they tend to move the elbow pipes 17, 18 toward each other.

The tilting of the bowl 14 within the ring 18' may be governed in any suitable manner, and preferably by means of a lever 19 weighted as indicated at 20 and having link means 21 for connecting it to suitable ears upon the bowl. This tilt governing means may be of the character shown in detail in said application.

In order that the accumulated water in the bowl 14 may be utilized to control the valve thereof, any suitable connection may be provided. To this end, I have herein represented the elbow pipes 17, 18 as provided with ears 22, 23 apertured to receive the journaled ends of a suitable cross head or other device 24 loosely receiving the valve stem 11 between the nuts 12, 13 thereof. If desired, the upper nuts may be set somewhat above the cross head 24 to permit a slight play and to enable the bowl to tilt somewhat before bringing the cross head 24 into engagement with said upper nuts. By this arrangement, the bowl acquires a certain momentum and effective force before it becomes active in lifting the valve disk from its seat.

The head 5 of the yoke arm 3 is herein represented as tapped to receive a water outlet pipe 25 which communicates with any suitable tank and is provided with a suitable valve casing 26 provided with a check valve opening toward the tank and preventing the back flow of water therefrom.

Tapped as indicated at 27 or otherwise suitably mounted in the inner faces of the yoke heads 4, 5 are pipes 28, 29. These pipes are respectively connected to the elbow pipes 17 and 18, so that the latter may oscillate thereon. It is of exceeding importance that a close joint be maintained between the said pipes 28, 29 and the said elbow pipes, in order to prevent the escape of steam or other fluid. For this purpose the said pipes 28, 29 are inserted within the elbow pipes 17, 18, and each is provided at its inserted end with an annular head or enlargement 30 which takes with a sliding fit against the annular enlargement or shoulder 31 upon the interior of its elbow pipe. Thus the inserted and containing pipes are herein represented as respectively provided with radial extensions engaging each other with a sliding fit. Within the scope of my invention so far as certain forms thereof are concerned, one only of said radial extensions need be employed, the other in such event being sufficiently prolonged radially to engage the other member of the coupling with a suitable sliding fit.

Each elbow pipe 17, 18 is provided with a threaded end 32 receiving an internally threaded nut 33 loosely mounted upon the pipe 28 or 29. Between the inner face of each nut 33 and the radial extensions 30 and 31, I position suitable packing herein shown as two washer rings 34, 35 of rubber or other suitable material and a metallic follower ring 36. By tightening the nuts 33, the said packing rings may be forced with sufficient pressure against the radial extensions or enlargements 30, 31.

It will be observed that the line of separation or of sliding fit between each head 30 and annular enlargement 31 is between the inner and outer edges of the adjoining washer ring 34. Thus the lateral face of each such washer 34 contacts directly with the edges of each head 30 and co-acting annular enlargement 31, and inasmuch as said parts have a sliding fit, little fluid can pass therebetween to the inner face of the said washers. Therefore but relatively slight pressure of each washer against the adjoining head and annular enlargement is necessary to prevent leakage. Owing to the fact that it is unnecessary to force said washers 34, 35 with extreme tightness against the heads 30 and annular enlargements 31, it is unnecessary laterally to expand said washers, and hence the elbow pipes 17 and 18 will turn relatively to the pipes 28, 29 with slight friction.

It will be observed that the nuts 33 and packing rings 34, 35, 36 are mounted upon the pipes 28, 29, but that they are not connected thereto and that said pipes are not held from axial movement with respect to the elbow pipes 17, 18. Not only may such axial movement be permitted but oscillatory movement of said elbow pipes 17, 18 with respect to the pipes 28, 29 is permitted, all of which occurs without leakage or loss of pressure. Although I have described my invention with detail reference to a steam trap, it is apparent that it may be employed in other relations.

Having thus described one illustrative embodiment of my invention, I desire it to be understood that although specific terms are employed, they are used in a generic and descriptive sense and not for purposes of limitation, the scope of the invention being set forth in the following claims:

1. A steam trap comprising in combination, a yoke having opposed arms, pipes mounted therein and extending toward each other, couplings mounted for oscillation upon said pipes, and means tending to move said couplings toward each other, said couplings and pipes being respectively provided with internal shoulders and circular heads engaging with a sliding fit, packing rings engaging end faces of said shoulders and heads, and means to confine said packing rings in position.

2. A steam trap comprising in combination, a yoke having opposed arms, pipes mounted therein and extending toward each other, means to spring said pipes toward each other, couplings mounted for oscillation upon said pipes, said couplings and pipes being respectively provided with internal shoulders and circular heads engaging with a sliding fit, packing rings engaging end faces of said shoulders and heads, and means to tighten said packing rings against said end faces.

3. A steam trap comprising in combination, supporting means, pipes mounted thereon, couplings mounted for oscillation upon said pipes, said couplings and pipes being provided with internal shoulders and heads engaging with a sliding fit, packing rings engaging end faces of said shoulders and heads, means to confine said packing rings in position and means tending relatively to move said couplings to press said rings axially of said pipes.

4. A steam trap comprising in combination, supporting means, pipes mounted thereon, couplings mounted for oscillation upon said pipes, said couplings and pipes being provided with internal shoulders and heads engaging with a sliding fit, packing rings engaging end faces of said shoulders and heads, means to confine said packing rings in position, a container, and pipes connecting said container and couplings having provision tending relatively to move said couplings to press said packing rings axially of said pipes.

In testimony whereof, I have signed my name to this specification, in the presence of two subscribing witnesses.

FRANK A. LITTLEFIELD.

Witnesses:
L. B. ARCHER,
M. D. COBLEIGH.

Copies of this patent may be obtained for five cents each, by addressing the "Commissioner of Patents, Washington, D. C."